United States Patent [19]
Takeuchi et al.

[11] 3,800,980
[45] Apr. 2, 1974

[54] PIPE STORING RACK

[75] Inventors: Tetsuo Takeuchi; Tadashi Orimoto, both of Chiba, Japan

[73] Assignee: Mitsui Shipbuilding and Engineering Co. Ltd., Tokyo, Japan

[22] Filed: Jan. 24, 1973

[21] Appl. No.: 326,256

[30] Foreign Application Priority Data
Jan. 25, 1972 Japan.......................... 47-9382

[52] U.S. Cl................ 221/195, 221/232, 214/1 PB, 214/8.5 K
[51] Int. Cl............................................. B65h 3/00
[58] Field of Search ............ 221/66, 123, 124, 193, 221/254, 191, 194, 195, 232; 214/1 PB, 8.5 K

[56] References Cited
UNITED STATES PATENTS
3,254,792   6/1966   Danielson et al................ 221/191 X Primary Examiner—Stanley H. Tollberg
Assistant Examiner—Joseph J. Rolla
Attorney, Agent, or Firm—Henry H. Skillman; Howson and Howson

[57] ABSTRACT

A pipe storing rack characterized in that pipe take-out passage is provided in the lower part of the rack in continuation to the vertical pipe storing passages, a pipe stopping projection is provided halfway in said pipe take-out passage, and a lift means adapted to push up a lowermost pipe held by said projection and force out said pipe under the weight of the succeeding pipes is also provided in said pipe take-out passage.

5 Claims, 11 Drawing Figures

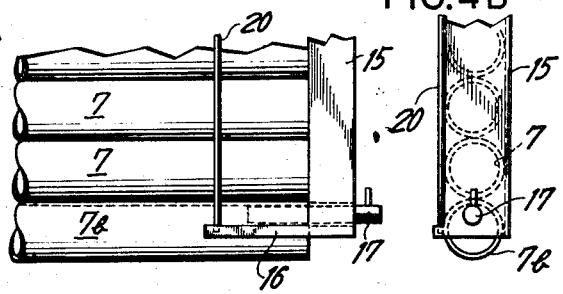 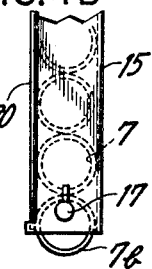
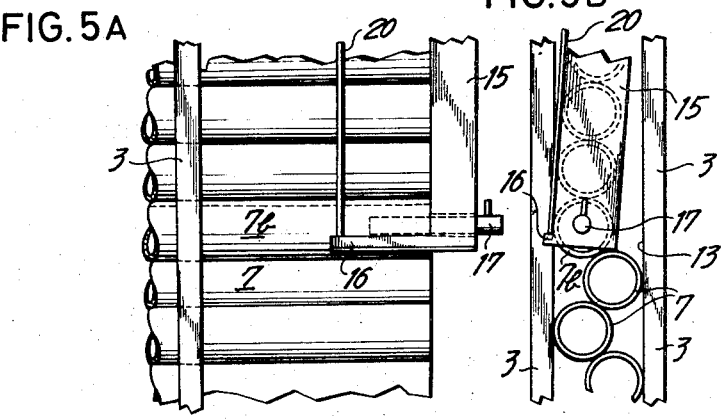 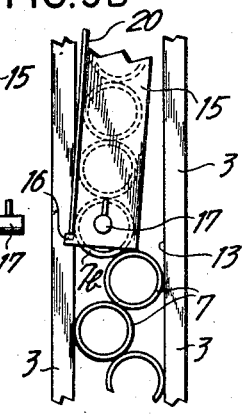
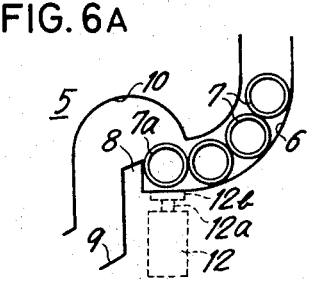 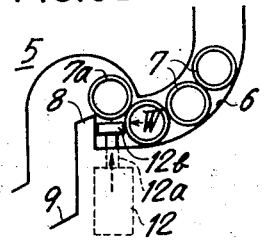
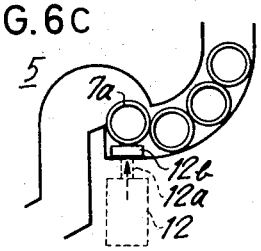 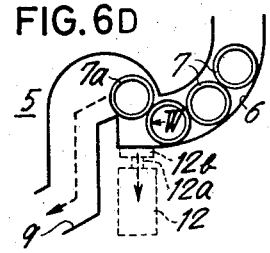

PIPE STORING RACK

This invention relates to a pipe storing rack in which a plurality of pipes can be stored according to the classification of quality, caliber, thickness and/or other such factors and desired pipes can be quickly selected and taken out on demand.

An object of this invention is to provide a pipe storing rack which has a simplified construction and whereby a desired pipe can be readily and quickly taken out.

In the drawings:

FIGS. 4A and 4B and 5A and 5B are respectively front and side views showing how weight of the pipes in the container is exerted and received; and FIGS. 6A to 6D are illustrations showing the discharge operation of a pipe.

Figure 1:
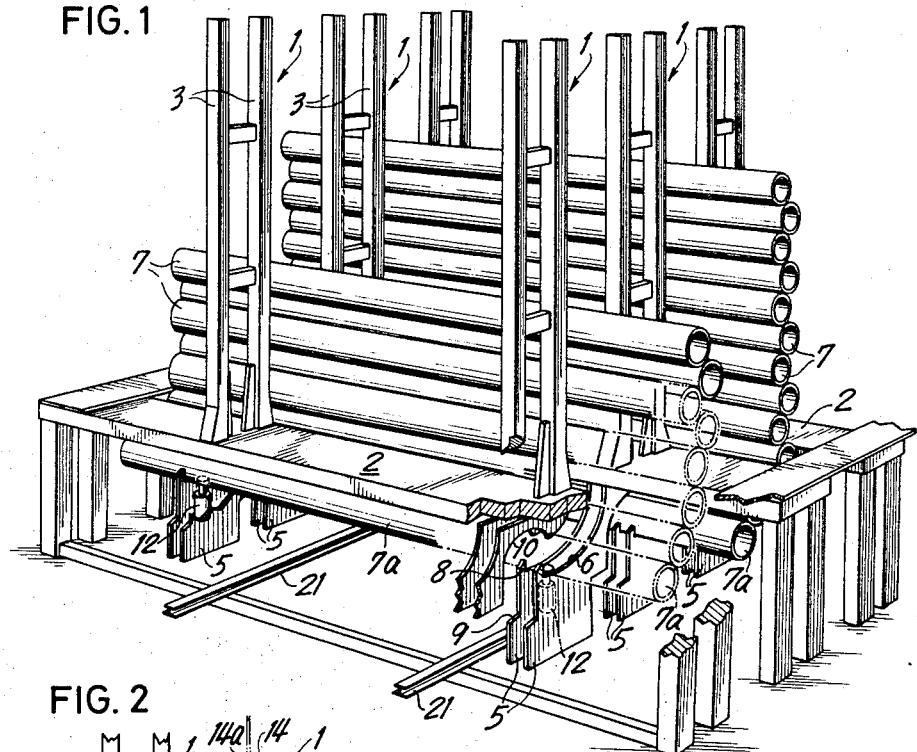
FIG. 1 is a perspective view of a pipe storing rack in accordance with this invention.
Figure 2:
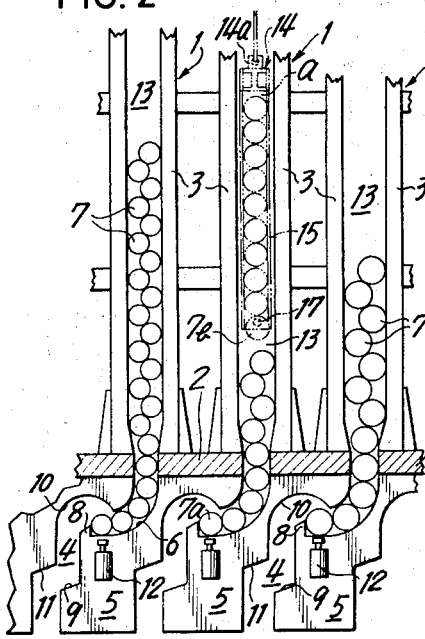
FIG. 2 is a sectional view of the pipe storing rack shown in FIG. 1.

This invention is now described in detail by way of an embodiment thereof with reference to the accompanying drawings.

Each of the unit structures 1 that constitute a storing rack consists of a pair of upright pillars 3 on the opposite sides of a frame 2, and a pair of parallel-arranged guide plates 5 provided under each pair of the pillars 3 to define a pipe take out passage 4 with the adjacent guide plates of next unit structure. The guide plate 5 has an arcuated part 6 at the upper part of the fore side thereof, an upward projection 8 as stopper for the pipe at the lower end of the arcuated part 6, and a step 9 formed at a lower part of the vertical portion of the fore side, an arcuated part 10 and a step 11 at the rear side to form the pipe taking zigzag passage 4 with adjacent guide plate 5. Between each pair of said guide plates 5 is disposed a lifting means such as a pneumatic or hydraulic cylinder 12 for lifting the pipe 7a held by the projection 8. The unit structures 1 having the above described arrangement are provided in any desired number in the juxtaposed relation to thereby constitute a storing rack having passages or spaces 13 in which the classified pipes 7 can be stored.

Figure 3:
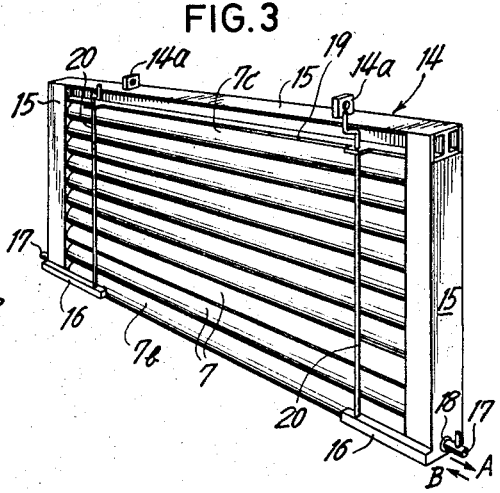
FIG. 3 is a perspective view of a pipe container.

A preferred example of the container 14 used for feeding pipes into the rack is shown in FIG. 3. This container 14 comprises a square framework 15 designed to contain therein a plurality of pipes in side by side arranged relation. Said framework 15 is opened at the bottom side, and at both ends of the opened side of said framework are provided bar-like members 16. A holding bar 20 is detachably secured to each of said members 16. The holding bars 20 extend to the upper end of the framework through holes in an upper horizontal support plate 19 and, in cooperation with side plates, hold the pipes. At both ends of the open side of the framework 15 are provided pipe engaging pins 17 which are slidably inserted in holes 18 of the framework.

For supplying the pipes into the storing rack by using the container 14, the support bars 20 of the container 14 shown in FIG. 3 are removed and the pipe engaging pins 17 are pulled in the direction of arrow A to be retracted from the container, and then the pipes 7 are placed in the container. When the container 14 is filled with pipes, pins 17 are then pushed in the direction of arrow B so that their ends are inserted into the lowermost pipe 7b, and then the support bars 20 are set in position. Thereafter, the container 14 is hoisted up by a crane with the ropes passed through hooks or rope-connecting lugs 14a and inserted into a desired storing space or passage 13 from the upper end. It will noted that the lowermost pipe 7b supported by the pins 17 are protruded slightly downwardly from the open bottom of the framework 15 while small space a is formed between the uppermost pipe 7c and the upper support plate 19. When the container 14 is suspended by the crane, the entire weight of the pipes is carried by the pins 17 as shown in FIG. 4, but when the lowermost pipe 7b touches the arcuated part 6 or the uppermost one of the already stored pipes in the rack as shown in FIG. 5, the total weight of the pipes in the container is carried by the arcuated part 6 or by the already stored pipes in the rack, and hence no load is exerted to the pins 17 and therefore they can be pulled out with ease. Thereafter, the container is again hoisted up, leaving the pipes in the rack. Thus, the pipes storing operation is very simple, and no specific buffer means is required.

In order to take out a desired pipe from the rack the cylinder 12 associated with the passage 13 containing desired sort of pipes is operated so that the piston rod 12a is raised to lift only one pipe 7a at the leading end of pipes in the passage 13 as shown in FIG. 6B. When the rod 12a of the cylinder 12 rises up to its upper limit as shown in FIG. 6C, the weight W of the remaining pipes is received by a cylinder adapter 12b, so that the pipe 7a is remained in its raised position without receiving any side pressure. When the rod 12a is lowered, the pipe 7a receives the weight W of the remaining pipes and is thereby forced out over the projections 8 as shown in FIG. 6D. The forced out pipe 7a is decelerated at the step 9 and then discharged as shown by dotted line in FIG. 6D, and the discharged pipe is further carried away along rails 21 shown in FIG. 1.

As described above, according to the present invention, it is possible to easily and readily take out only one piece of pipe of a desired sort from classified groups of pipes with a very simple operation.

What is claimed is:

1. Dispensing apparatus for a pipe storing rack having a vertical magazine for storing pipes in superimposed relation, the lower end of said magazine having a discharge opening communicating with a ramp declining therefrom, said ramp terminating in an upward projection for stopping downward displacement of pipes stored in said magazine and on said ramp, a zig-zag shaped pipe-take-out passage disposed above said projection in communication with said ramp, said dispensing mechanism including a cylinder-and-piston means, the piston being actuated by said cylinder and disposed below said ramp adjacent said projection and in registry with said take-out passage, said piston operable to be displaced by said cylinder upwardly past said ramp to elevate the lowermost pipe of the stored pipes, the width of said piston and the full upward stroke of the same being operable to elevate the lowermost pipe relative to the adjacent pipe a sufficient distance that upon retraction of the piston to a position below the ramp, the adjacent pipe, under the weight of the remaining pipes, is displaced under the lowermost pipe to raise the latter over the projection and into the take-out passage for discharge from the apparatus.

2. A dispensing apparatus according to claim 1 wherein said zig-zag take-out passage where it registers with the lower end of said ramp being curved away from said ramp whereby upon displacement of the lowermost pipe into said passage, the passage guides said pipe beyond said upward projection, said passage declining downwardly from said upward projection whereby gravity effects discharge of said pipe through said passage after displacement of said pipe beyond said projection.

3. Apparatus according to claim 1 wherein the apparatus provides a limited clearance above said ramp to confine the pipes displaced therealong to a single layer, the stroke of said piston being approximately one half of said clearance.

4. Apparatus according to claim 1 wherein said magazine is formed by a plurality of upright pillars disposed in pairs, said pipes being stored between the pillars of each pair, and said pairs being disposed in longitudinally spaced relation along the length of the pipes, said ramps comprising guide plates under each pair of pillars, said cylinder-and-piston means comprising a piston in registry with each pair of pillars and the associated guide plate means.

5. Apparatus according to claim 1 wherein said upward projection has a height greater than one-half of, and less than the full, height of the lowermost pipe.

* * * * *